(12) United States Patent
Zhao et al.

(10) Patent No.: US 12,024,432 B2
(45) Date of Patent: Jul. 2, 2024

(54) POROUS CARBON BLOCK MATERIAL HAVING HIGH ELASTICITY AND HIGH GAS TIGHTNESS AND METHOD FOR PREPARING THE SAME

(71) Applicant: YANSHAN UNIVERSITY, Qinhuangdao (CN)

(72) Inventors: Zhisheng Zhao, Qinhuangdao (CN); Yingju Wu, Qinhuangdao (CN); Zitai Liang, Qinhuangdao (CN); Yang Zhang, Qinhuangdao (CN); Xiaoyu Wang, Qinhuangdao (CN); Zewen Zhuge, Qinhuangdao (CN); Julong He, Qinhuangdao (CN); Dongli Yu, Qinhuangdao (CN); Bo Xu, Qinhuangdao (CN); Yongjun Tian, Qinhuangdao (CN)

(73) Assignee: YANSHAN UNIVERSITY (CN)

( * ) Notice: Subject to any disclaimer, the term of this patent is extended or adjusted under 35 U.S.C. 154(b) by 0 days.

(21) Appl. No.: 17/842,276

(22) Filed: Jun. 16, 2022

(65) Prior Publication Data

US 2023/0096512 A1    Mar. 30, 2023

(30) Foreign Application Priority Data

Sep. 30, 2021   (CN) .......................... 202111168176.4

(51) Int. Cl.
*C01B 32/05*   (2017.01)

(52) U.S. Cl.
CPC .......... *C01B 32/05* (2017.08); *C01P 2002/60* (2013.01); *C01P 2002/72* (2013.01);
(Continued)

(58) Field of Classification Search
None
See application file for complete search history.

(56) References Cited

U.S. PATENT DOCUMENTS 3,664,859 A * 5/1972 Beatty .................. C04B 35/521
                                                   427/249.1
5,208,003 A    5/1993 Simandl et al.
(Continued)

FOREIGN PATENT DOCUMENTS

CN    102414125 A    4/2012
CN    102906017 A    1/2013
(Continued)

OTHER PUBLICATIONS

The first Office Action issued by the China National Intellectual Property Administration (CNIPA) dated Jun. 30, 2023 for the Chinese Patent Application No. 202111168176.4. (English translation included).

(Continued)

*Primary Examiner* — Humera N. Sheikh
*Assistant Examiner* — Kim S. Horger
(74) *Attorney, Agent, or Firm* — MASCHOFF BRENNAN

(57) ABSTRACT

The application provides a porous carbon block material having high elasticity and high sealing, and provides a method for preparing the same. Particularly, the present application provides a porous carbon block material, wherein the porous carbon block material has a pore size in the range of from 3 nm to 100 nm, a porosity of from 50% to 87%, and the pores in the material are closed pores. In addition, the application provides a method for preparing the porous carbon block material according to the present application. The porous carbon block material according to the present application has small pore size, high porosity, and closed pores, and thus has high strength combined with high elasticity, high sealing property, and low density. Hence, the porous carbon block material according to the present application may be used as a sealing material.

10 Claims, 11 Drawing Sheets

(52) U.S. Cl.
CPC ...... *C01P 2004/03* (2013.01); *C01P 2004/04* (2013.01); *C01P 2004/84* (2013.01); *C01P 2006/10* (2013.01); *C01P 2006/16* (2013.01); *C01P 2006/21* (2013.01); *C01P 2006/90* (2013.01)

(56) References Cited

U.S. PATENT DOCUMENTS

| | | | |
|---|---|---|---|
| 2012/0077020 A1 | 3/2012 | Muramatsu et al. | |
| 2015/0184495 A1 | 7/2015 | Zhou et al. | |
| 2017/0036915 A1* | 2/2017 | Worsley | C01B 32/184 |

FOREIGN PATENT DOCUMENTS

| | | |
|---|---|---|
| CN | 108530098 A | 9/2018 |
| CN | 109400160 A | 3/2019 |
| CN | 110357074 A | 10/2019 |
| CN | 111635247 A | 9/2020 |
| CN | 112830784 A | 5/2021 |
| CN | 113277849 A | 8/2021 |
| EP | 0365327 A2 | 4/1990 |
| JP | H10259077 A | 9/1998 |
| JP | 2004043241 A | 2/2004 |
| JP | 2021031377 A | 3/2021 |
| WO | 2019239178 A1 | 12/2019 |

OTHER PUBLICATIONS

The first Office Action issued by the Japanese Patent Office dated Jul. 18, 2023 for the Japanese Patent Application No. 2022-104639. (English translation included).

Osswald, S. et al., Control of sp2/sp3 Carbon Ratio and Surface Chemistry of Nanodiamond Powders by Selective Oxidation in Air, Journal of the American Chemical Society, 128, 35, 11635-11642, Aug. 2006.

Osswald, S. et al., Plasma pressure compaction of nanodiamond, Diamond and Related Materials, 16, 1967-1973, Sep. 2007.

The Office Action issued by the Japanese Patent Office dated Dec. 25, 2023 for the Japanese Patent Application No. 2022-104639. (English translation included).

The Second Office Action issued by the State Intellectual Property Office of People's Republic of China dated Feb. 19, 2024 for the Chinese Patent Application No. 202111168176.4. (English translation included).

* cited by examiner ically, an amorphous-carbon-coated diamond nanoparticle is composed of a diamond core having a size of several to several hundred nanometers and amorphous carbon wrapped on the surface of the diamond core. The amorphous carbon generally has a thickness of from 1 to 5 nm.

PORous Carbon Block Material Having High Elasticity and High Gas Tightness and Method for Preparing the Same

CROSS-REFERENCE TO RELATED APPLICATION

This application claims priority to Chinese Patent Application No. 202111168176.4 entitled "Porous Carbon Block Material Having High Elasticity and High Gas Tightness and Method for Preparing the Same" that was filed on Sep. 30, 2021, which is incorporated herein by reference in its entirety.

TECHNICAL FIELD

The present application relates to the technical field of carbon material preparation, in particular to a porous carbon block material and a method for preparing said porous carbon block material.

BACKGROUND

Usually, inorganic non-metallic materials are brittle, and thus exhibit minimal elastic deformation (usually less than 1%) at room temperature. When the elastic limit is exceeded, micro-cracks present in these materials would rapidly expand, resulting in instantaneous destruction of the materials. Moreover, the application of inorganic non-metallic materials has been greatly limited owing to their minimal elastic deformation. Accordingly, in modern material design, it is still a long-term goal and challenge to design and manufacture inorganic non-metallic materials having high performance such as high strength, high elasticity, and low density.

SUMMARY

Carbon has the flexibility of forming sp, $sp^2$ or $sp^3$ hybrid bonds, and thus has the potential of becoming a material having excellent comprehensive properties, such as low density, high strength, high hardness, high elasticity and adjustable electronic properties. Generally, a carbon material having low density and high elasticity may be obtained by forming a porous structure. For example, some recently developed carbon-based porous materials combine the advantages of low density and excellent elastic deformability. These known porous materials, however, have open pores inside, thus have no gas tightness and have a compressive strength of no more than 1 MPa, which limits their ranges of application.

In order to solve the above technical problems, the present application provides a carbon material having high strength, high elasticity, high gas tightness, and low density, and being capable of adapting to various complicated environments.

In the first aspect, the present application provides a porous carbon block material, wherein the porous carbon block material has a pore size in the range of from 3 nm to 100 nm;
    the porous carbon block material has a porosity of from 50% to 87%; and
    the pores in the porous carbon block material are closed pores.

The porous carbon block material according to the present application may be prepared, for example, from amorphous-carbon-coated diamond nanoparticles as raw material, by spark plasma sintering or hot pressing.

In one embodiment of the porous carbon block material according to the present application, the porous carbon block material has a pore size in the range of from 3 nm to 100 nm (for example, in the range of from 4 to 100 nm or in the range of from 5 nm to 100 nm); preferably the porous carbon block material has a pore size in the range of from 5 nm to 50 nm; and more preferably, the porous carbon block material has a pore size in the range of from 5 nm to 30 nm.

In one embodiment of the porous carbon block material according to the present application, the porous carbon block material has a porosity of from 50% to 87%; preferably the porous carbon block material has a porosity of from 56% to 82%; and more preferably the porous carbon block material has a porosity of from 60% to 80%.

In one preferred embodiment of the porous carbon block material according to the present application, the amorphous-carbon-coated diamond nanoparticles being used as a raw material have a grain size of from 5 to 400 nm; preferably, from 5 to 350 nm; and more preferably, from 5 to 300 nm.

In one preferred embodiment of the porous carbon block material according to the present application, the porous carbon block material has a compressive strain of ≥5%; more preferably, the porous carbon block material has a compressive strain of ≥6%; and most preferably, the porous carbon block material has a compressive strain of ≥7%. In addition, in a preferred embodiment of the porous carbon block material according to the present application, the compressive strain of the porous carbon block material returns to zero after the stress is removed.

In one preferred embodiment of the porous carbon block material according to the present application, the porous carbon block material has a compressive strength of >100 MPa, and more preferably, the porous carbon block material has a compressive strength of >150 MPa.

In one preferred embodiment of the porous carbon block material according to the present application, the porous carbon block material has a helium gas leakage rate of ≤10×10$^{-5}$ Pa·m$^3$/s; more preferably, the porous carbon block material has a helium gas leakage rate of ≤4×10$^{-5}$ Pa·m$^3$/s; and most preferably, the porous carbon block material has a helium gas leakage rate of ≤2×10$^{-5}$ Pa·m$^3$/s.

In one preferred embodiment of the porous carbon block material according to the present application, the porous carbon block material has a density of from 0.3 g/cm$^3$ to 1.1 g/cm$^3$; preferably, the porous carbon block material has a density of from 0.4 g/cm$^3$ to 1.0 g/cm$^3$; and most preferably, the porous carbon block material has a density of from 0.5 g/cm3 to 0.9 g/cm$^3$.

In one embodiment of the porous carbon block material according to the present application, the porous material is prepared from an amorphous-carbon-coated diamond nanoparticles as the raw materials by spark plasma sintering or hot pressing. Preferably, the raw materials of the porous material are solely amorphous-carbon-coated diamond nanoparticles. Herein, amorphous-carbon-coated diamond nanoparticles are materials well-known in the art. In one preferred embodiment of the porous carbon block material according to the present application, the amorphous-carbon-coated diamond nanoparticles have a grain size of from 5 nm to 400 nm, preferably 5 nm to 350 nm, and more preferably 5 nm to 300 nm.

In the second aspect, the present application provides a method for preparing the porous carbon block material according to the first aspect of the present application, comprising
- A) taking amorphous-carbon-coated diamond nanoparticles as precursor powders;
- B) placing the precursor powders from step A) into a mold and pre-pressing them to form a pre-pressed billet;
- C) placing the pre-pressed billet obtained from step B) into a sintering mold; placing the sintering mold containing the pre-pressed billet into sintering equipment; and then applying a sintering pressure, heating it to a sintering temperature, and holding the pressure and temperature to perform sintering, wherein
  the sintering pressure is from 5 MPa to 100 MPa, and the sintering temperature is from 1000° C. to 2000° C.; and
- D) taking out the mold and releasing a sintered body from the mold to obtain the porous carbon block material.

In an embodiment of the method according to the present application, the raw materials as used may be amorphous-carbon-coated diamond nanoparticles. Preferably, the raw materials as used are solely amorphous-carbon-coated diamond nanoparticles. Herein, the amorphous-carbon-coated diamond nanoparticles are materials well-known in the art. In one preferred embodiment of the method according to the present application, the amorphous-carbon-coated diamond nanoparticles in step A) have a grain size of from 5 nm to 400 nm, preferably from 5 nm to 350 nm, and more preferably from 5 nm to 300 nm.

In one preferred embodiment of the method according to the present application, the pre-pressing of step B) is conducted by applying a pressure bidirectionally, wherein the pressures as applied may be from 1 MPa to 20 MPa, preferably from 2 MPa to 15 MPa, more preferably from 2 MPa to 10 MPa, and most preferably from 2 MPa to 5 MPa.

In one still preferred embodiment of the method according to the present application, in the pre-pressing of step B), the pressure holding time is from 1 min to 20 min, preferably from 1 min to 15 min, more preferably from 1 min to 10 min, and most preferably from 1 min to 5 min.

In one preferred embodiment of the method according to the present application, in step C), the sintering pressure is from 5 MPa to 100 MPa, preferably from 5 MPa to 80 MPa, and more preferably from 10 MPa to 70 MPa.

In one preferred embodiment of the method of the present application, in step C), the sintering temperature is from 1000° C. to 2000° C., preferably from 1300° C. to 2000° C., and more preferably from 1400° C. to 2000° C.

In one preferred embodiment of the method according to the present application, in step C), the heating rate is from 5° C./min to 200° C./min, preferably from 8° C./min to 150° C./min, more preferably from 10° C./min to 100° C./min.

In one preferred embodiment of the method according to the present application, in step C), the temperature holding time is from 0 min to 30 min, preferably from 0 min to 20 min, and more preferably from 0 min to 15 min.

In one preferred embodiment of the method according to the present application, the sintering mold in step C) is a graphite mold, and wherein the pre-pressed billet is separated from the graphite mold via a graphite sheet, and the outside of the graphite mold is wrapped with carbon felt.

In one preferred embodiment of the method according to the present application, the sintering in step C) is a spark plasma sintering or a hot press sintering.

In one preferred embodiment of the method according to the present application, in step C), optionally applying an initial pressure of from 2 MPa to 10 MPa before applying the sintering pressure, and vacuumizing to a vacuum degree of higher than $1 \times 10^{-1}$ Pa, thereafter, applying the sintering pressure.

In one preferred embodiment of the method according to the present application, in step C), after the sintering pressure is stabilized to a preset value, heating the sintering mold to the sintering temperature, and then holding the temperature to conduct the sintering.

Preferably, the method according to the present application further comprises step C'): cooling and depressurizing to normal pressure after the sintering step and before step D), wherein the cooling rate is preferably from 100° C./min to 1000° C./min.

The porous carbon block material according to the first aspect of the present application and the porous carbon block material prepared by the method according to the second aspect of the present application have small pore sizes, high porosity and closed pores, and therefore, have high strength combined with high elasticity, and also have high gas tightness and low density. In particular, the porous carbon block material according to the first aspect of the present application and the porous carbon block material prepared by the method according to the second aspect of the present application can be used as a sealing material owing to the high elasticity and good gas tightness thereof.

BRIEF DESCRIPTION OF THE DRAWINGS

Those skilled in the art will understand that the following drawings are only illustrative. It is anticipated that these drawings would not limit the scope as claimed in any way.

FIGS. 6A, 6B and 6C show the room temperature uniaxial compression stress-strain curves of the porous carbon block materials prepared in Examples 1 to 3 according to the present application, wherein FIG. 6A represents Example 1, FIG. 6B represents Example 2, and FIG. 6C represents Example 3.

FIGS. 7A, 7B and 7C show stress-strain curves of cyclic compression at room temperature of the porous carbon block materials prepared in Examples 1 to 3 according to the present application, wherein FIG. 7A represents Example 1, FIG. 7B represents Example 2, and FIG. 7C represents Example 3.

DETAILED DESCRIPTION

Figure 1A:
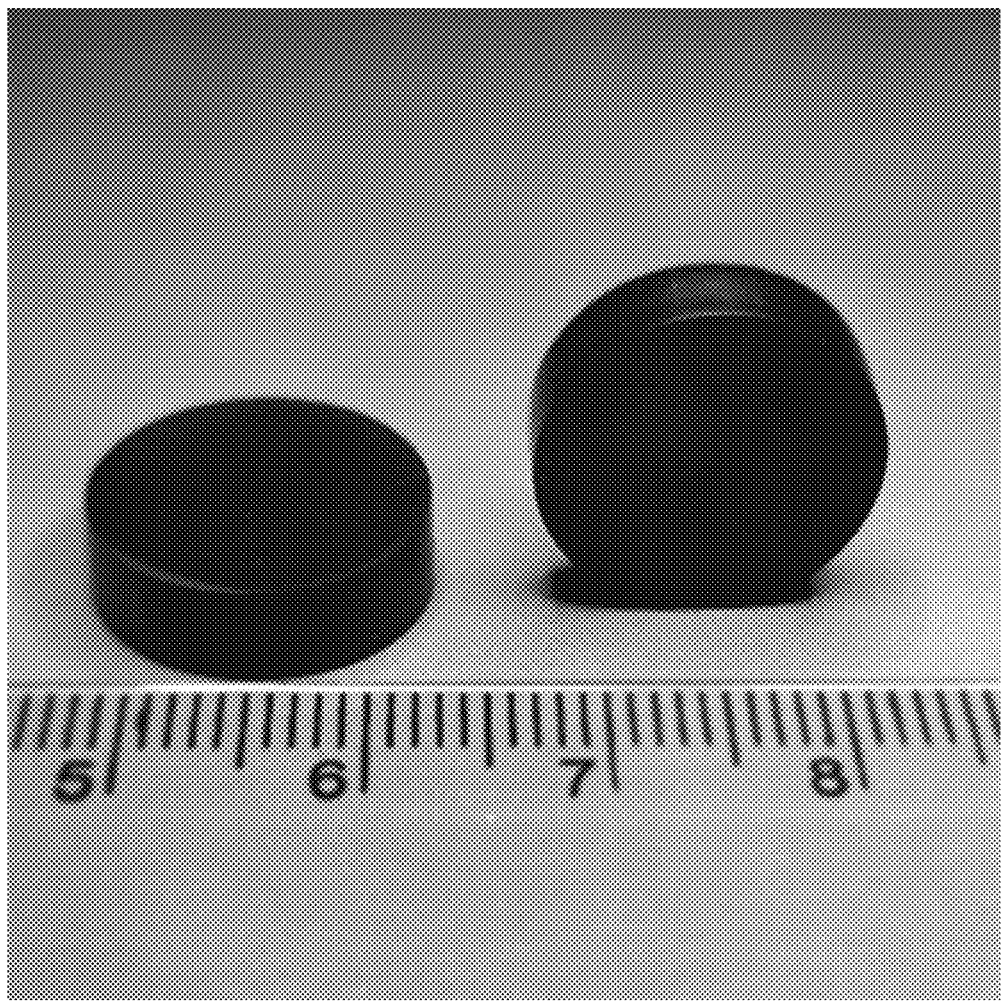
FIG. 1A is a real photo of a porous carbon block material prepared according to one embodiment of the present application, wherein the unit of the ruler shown is centimeter.

In the context of the present disclosure, where a material is described as containing, comprising, or including specific component(s), or where a method is described as containing, comprising, or including specific step(s), it is anticipated that the material according to the present application may mainly consist of or consist of the specific component(s), and that the method according to the present application may mainly consist of or consist of the specific step(s).

Unless otherwise stated expressly, the terms "comprising", "including", "containing", and "having" should be interpreted as being open-ended and not limiting.

Unless otherwise stated expressly, the steps of the method according to the present application are employed under normal temperature and pressure.

Where numerical ranges are disclosed herein, the numerical range should be interpreted as being continuous and thus including the minimum and maximum values of the range as well as every value between the minimum and maximum values. In addition, where a range refers to an integer range, each integer between the minimum and the maximum values of the range is included. Where several ranges are provided to describe certain features or characteristics, these ranges may be combined. That is, unless otherwise specified, all ranges disclosed herein should be understood as encompassing any and all sub-ranges contained therein. For example, the specified range of "from 1 to 10" should be interpreted as including any and all sub-ranges between the minimum value 1 and the maximum value 10. In addition, the amount range of each component according to the present application includes any combination of any lower limit with any upper limit mentioned herein, and all these amount ranges are encompassed within the scope as claimed.

Those skilled in the art should understand that, the term "about" as used herein used is intended to indicate that a number, parameter, or feature defined by it may have a positive or negative percentage error within a certain range (for example ±5%) in the specific scientific context in which the term is utilized. In addition, since all numbers, values, and expressions related to the amounts used herein may have measurement errors, all the specific values as recited herein should be understood as being implicitly modified by the term "about", unless otherwise specified.

In the present disclosure, some preferred value ranges for certain properties or parameters in preferred embodiments are provided. Those skilled in the art should understand that the respective value ranges for different performance parameters in different embodiments may be combined in any manner, and all possible combinations are considered as being disclosed herein.

According to the first aspect of the present application, there is provided a porous carbon block material, wherein
the porous carbon block material has a pore size in the range of from 3 nm to 100 nm;
the porous carbon block material has a porosity of from 50% to 87%; and
the pores in the porous carbon block material are closed pores.

Herein, the term "block material" means that the material is a solid block having a certain volume; that is, a solid material not existing as granules or powders. The porous carbon block material according to the present application may have any volume as needed, for example but not limited to, a volume of at least 10 mm$^3$, at least 100 mm$^3$, or at least 300 mm$^3$, or a volume of at most 100 dm$^3$, at most 1000 cm$^3$, or at most 10 cm$^3$.

The porous carbon block material according to the present application has a small pore size. In one preferred embodiment of the porous carbon block material according to the present application, the porous carbon block material has a pore size in the range of from 3 nm to 100 nm, preferably in the range from 5 nm to 50 nm, and more preferably in the range from 5 nm to 30 nm. In the present disclosure, the pore size of a porous carbon block material may be measured from high-resolution transmission electron microscopy images. In the context of the present disclosure, a "pore size in the range of from a nm to b nm" should be construed as indicating that, when the pore size of a material is measured from for example high-resolution transmission electron microscopy images, the pore sizes of most pores in the material as measured fall within the range of from a nm to b nm. Those skilled in the art could understand that, due to the limitation of the manufacturing process, the term "pore size in the range of from a nm to b nm" will not exclude the possibility that a small amount of pore sizes may fall outside the range of from a nm to b nm. Therefore, the term "pore size in the range of from a nm to b nm" should be construed as meaning that, based on the number of pores, at least 80%, for example, at least 90%, preferably at least 95%, and most preferably at least 98%, of the pores have pore sizes falling within the range of from a nm to b nm. For example, the percentage of the pore sizes that falls within the specified range may be determined by observing one or more (for example 3, 5, or 10) randomly selected regions of the material by means of a transmission electron microscope, and measuring each pore size in the region(s) and counting the pores having sizes that fall within the specified range.

The porous carbon block materials according to the present application have a high porosity. In one preferred embodiment of the porous carbon block material according to the present application, the porous carbon block material may have a porosity of from % 50 to 87%, preferably from 56% to 82%, and more preferably from 60% to 80%. In the context of the present disclosure, the porosity of a porous carbon block material can be calculated based on the tested density of a sample of the material and the theoretical density of graphite. Specifically, the porosity is calculated as follows:

$$k = 1 - \rho_{sample}/\rho_{graphite},$$

wherein, k is the porosity, $\rho_{sample}$ is the density of a sample, and $\mu g_{raphite}$ is the theoretical density of graphite (2.26 g/cm$^3$).

The measurement and calculation of the density of the sample will be described in more details hereinafter.

According to the present application, the pores in the porous carbon block material are closed pores. As observed by the transmission electron microscope, it can be found that sintered curved multilayer graphene sheets are arranged chaotically, and cross-linked mutually, resulting in the formation of a large number of closed nano-scale pores. As used herein, "the pores in the porous carbon block material are closed pores" should be construed as meaning that most of the pores in the material are closed when observed by, for example, a transmission electron microscope. Those skilled in the art could understand that, due to the limitation of the manufacturing process, "the pores in the porous carbon block material are closed pores" does not exclude the possibility that a small number of pores or individual pores are open pores. Therefore, "the pores in the porous carbon block material are closed pores" should be construed as meaning that, based on the number of the pores, at least 90%, such as 95%, preferably at least 96%, and most preferably at least 98% of the pores are closed. The percentage of the closed pores may be determined as follows: randomly selecting one or more (for example 3, 5, or 10) region(s) to be observed for example via a transmission electron microscope; and counting the numbers of closed pores and open pores in the region(s).

As observed by a scanning electron microscope, a porous carbon block material according to the present application has a flat cross-section surface, and essentially has no micron-sized pores (for example, based on numbers, micron-sized pores are less than 3‰, more preferably less than 1‰).

In the present disclosure, the porous carbon block material is prepared from amorphous-carbon-coated diamond nanoparticles. It is advantageous to use amorphous-carbon-coated diamond nanoparticles as raw materials. On the one hand, the amorphous-carbon-coated diamond nanoparticles are in a metastable state, and thus undergo a structural transformation owning to graphitization during sintering; moreover, the volume expansion will prompt the combination of particles, resulting in an improved strength of the block. On the other hand, the amorphous-carbon-coated diamond powders have a high surface activity, and thus undergo rapid graphitization during sintering to form graphene sheets having high curvature; and these graphene sheets cross-link and support mutually to form a lot of pores, resulting in a reduced density of the material. Moreover, onion-like graphene layers formed from the phase-transformation of small size diamond powders have higher curvature, which render them easier to form uniformly distributed pores, and at the same time, render them easier to cross-link between layers. As a result, the graphene sheets have stable linking between layers, and thus are more likely to occur elastic deformation under external force, but are not prone to be damaged, leading to an increased elastic limit. In one preferred embodiment of the porous carbon block material according to the present application, the amorphous-carbon-coated diamond nanoparticles have a grain size of from 5 nm to 400 nm, preferably from 5 nm to 350 nm, and more preferably from 5 nm to 300 nm.

In one preferred embodiment of the porous carbon block material according to the present application, the porous carbon block material has a density of from 0.3 g/cm$^3$ to 1.1 g/cm$^3$, preferably from 0.4 g/cm$^3$ to 1.0 g/cm$^3$, and more preferably from 0.5 g/cm$^3$ to 0.9 g/cm$^3$. In particular, the porous carbon block material according to the present application has a density of not higher than 0.7 g/cm$^3$, for example 0.5 g/cm$^3$ to 0.7 g/cm$^3$.

In the present disclosure, the density of a porous carbon block material can be calculated by dividing the mass of a sample by its volume. Particularly, a sample can be processed into a cylinder with a diameter of 20 mm and a height of 5 mm, and the volume of the sample $V_{sample}$ can be calculated according to the formula for calculating the volume of the cylinder; then the sample can be weighed on a high precision electronic balance to obtain the weight of the sample $m_{sample}$. The density of the sample $\rho_{sample} = m_{sample}/V_{sample}$.

In one preferred embodiment of the porous carbon block material according to the present application, the porous carbon block material has a compressive strain of ≥5%; preferably, the porous carbon block material has a compressive strain of ≥6%, and more preferably, of ≥7%.

In one preferred embodiment of the porous carbon block material according to the present application, the porous carbon block material has a compressive strength of >100 MPa, and preferably >150 MPa. For example, the porous carbon block material may have a compressive strength of from 100 MPa to 400 MPa, preferably from 120 MPa to 350 MPa, and more preferably from 150 MPa to 300 MPa.

In the present disclosure, the compressive strain and compressive strength of porous carbon block materials can be measured according to the method of GB/T 8489-2006. The compressive strength and compressive strain may be measured on a material mechanical property testing machine commonly used in the art. A sample of the material is tested at room temperature to obtain the corresponding properties. The test sample may be a cylinder, for example having a diameter of 3 mm and a height of 4.5 mm. The strain rate loaded by the material mechanical property testing machine is, for example, from $1 \times 10^{-5}$ to $1 \times 10^{-2}$. The material mechanical property testing machine used according to the present application is, for example, TE-3000 Mechanical Testing Machine obtained from Jin Yin Feng Instrument Ltd., Ji Nan, Shandong Dong Province, China.

In one preferred embodiment of the porous carbon block material according to the present application, the porous carbon block material has a helium gas leakage rate of ≤$10 \times 10^{-5}$ Pa·m$^3$/s; preferably, the porous carbon block material according to the present application has a helium gas leakage rate of ≤$5 \times 10^{-5}$ Pa·m$^3$/s; more preferably, the porous carbon block material according to the present application has a helium gas leakage rate of ≤$2 \times 10^{-5}$ Pa·m$^3$/s. For example, the porous carbon block material according to the present application may have a helium gas leakage rate of from $0.2 \times 10^{-5}$ Pa·m$^3$/s to $10 \times 10^{-5}$ Pa·m$^3$/s, preferably from $1 \times 10^{-5}$ Pa·m$^3$/s to $5 \times 10^{-5}$ Pa·m$^3$/s, more preferably from $1 \times 10^{-5}$ Pa·m$^3$/s to $2 = 10^{-5}$ Pa·m$^3$/s, and even from $0.2 \times 10^{-5}$ Pa·m$^3$/s to $1 \times 10^{-5}$ Pa·m$^3$/s.

In the present disclosure, the gas tightness of a sample can be characterized by its helium gas leakage rate. Helium, as the smallest gas molecule, can easily penetrate tiny cracks or holes. Moreover, helium, existing in the air in a trace amount (5 ppm), is chemically inert and thus will not react with any materials of parts in the testing machine. Therefore, Helium gas leakage rate has been widely used as a high precision measurement of gas tightness to characterize the gas tightness of equipment and devices in the industry.

Figure 9:
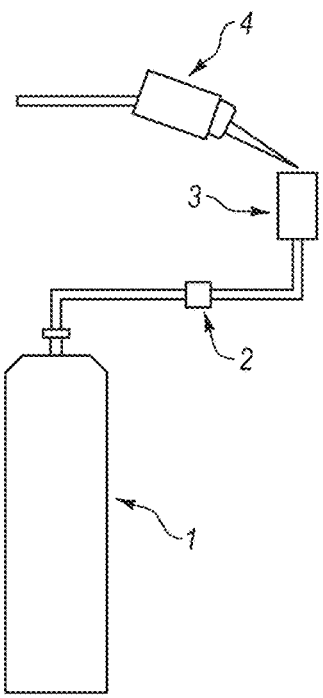
FIG. 9 shows a schematic diagram of a device for helium gas leakage rate testing.
Figure 10:
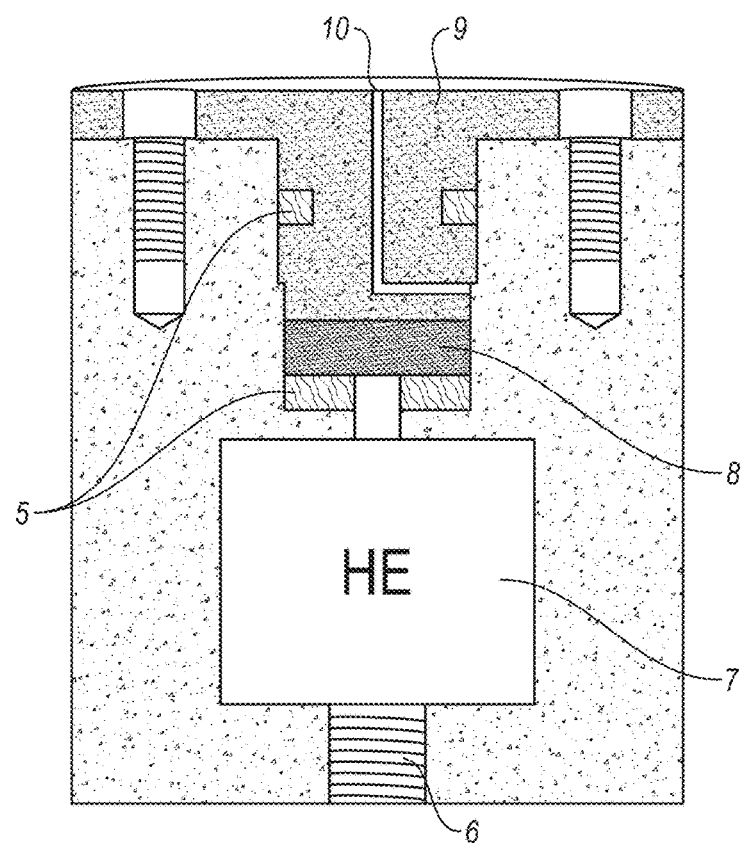
FIG. 10 is a partial enlarged view of component 3 in the device for helium gas leakage rate testing in FIG. 9.

The testing of helium gas leakage rate is performed on a self-built instrument. FIG. 9 is a schematic diagram of the instrument for testing helium gas leakage rate, including a helium cylinder 1, a pressure sensor 2, a testing tool 3, and a sniffer 4, wherein the sniffer 4 is connected to a leakage detector. FIG. 10 is a partial enlarged view of the testing tool 3 of the instrument for testing the helium gas leakage rate of FIG. 9, including an elastic sealing ring 5, a helium gas inlet 6, a cavity 7, a testing sample 8, a bolt fastened cover 9, and a helium outlet 10. Referring to FIGS. 9 and 10, the helium gas leakage rate testing can be performed as follows: using helium (He) gas as the testing medium; placing the testing sample 8 into the testing tool 3, wherein the helium inlet 6 of the testing tool 3 is connected to the helium cylinder 1 and a certain gas pressure $P_{inlet}$ is applied at the helium inlet 6, and wherein the helium gas outlet 10 can be opened to allow the testing sample 8 to enter into the instrument; covering the helium outlet 10 with the bolt fastened cover 9, wherein the bolt fastened cover 9 has a protruding sealing rod for installing the elastic sealing ring 5, and wherein the sealing rod has a leakage hole leading to the air atmosphere at the part in contact with the tested sample 8; and then passing helium gas into the cavity 7 and holding the pressure for such as 3 minutes. The readings of the helium gas leakage detector are continuously monitored. If there is a helium gas leakage through the testing sample 8, the helium gas leakage can be sniffed by the helium gas leakage detector connected to the sniffer 4. The real-time leakage rate under a static pressure can be read on the digital display equipped on the helium gas leakage detector.

The porous carbon block material according to the present application preferably has a high compressive strain (≥5%), which returns to zero after the stress applied is removed. That is, it exhibits many properties similar to rubber, and thus can be referred to as "rubber-like carbon". Preferably, the porous carbon block material has "high elasticity". More preferably, the rubber-like carbon described herein also has a very low helium gas leakage rate as described herein, and preferably has "high sealing property" or "high gas tightness". Further preferably, the rubber-like carbon as described herein also has a density as described herein, and preferably has "light weight". The porous carbon block material of the present application, when being observed by a transmission electron microscope, shows a three-dimensional porous structure having pore boundaries formed from curved multilayer graphene sheets. Specifically, the three-dimensional porous structure is formed from multi-layer graphene sheets arranged chaotically and cross-linked with each other and from a large number of nano-scale pores between the graphene sheets, which pores are closed. Herein, the "high sealing property" or "high gas tightness" of the porous carbon block material can be attributed to the rubber-like carbon structure. Preferably, there are substantially no micron-sized pores in the porous carbon block material of the present application.

In the present disclosure, the porous carbon block material preferably has "high gas tightness", which means that it has a helium gas leakage rate of no higher than $5 \times 10^{-5}$ Pa·m$^3$/s.

In the present disclosure, the porous carbon block material preferably has "high elasticity", which means that it has a compressive strain of ≥about 5%, preferably ≥about 7%, and more preferably ≥about 10%. Therefore, particularly preferably, the porous carbon block material of the present application has a compressive strain of ≥10%. More preferably, the compressive strain of the porous carbon block material returns to zero after the stress applied is removed.

In the present disclosure, the porous carbon block material preferably has "light weight", which means that the porous carbon block material has a very low density, which for example, may be from 0.3 g/cm$^3$ to 1.1 g/cm$^3$, preferably from 0.4 g/cm$^3$ to 1.0 g/cm$^3$, more preferably from 0.5 g/cm$^3$ to 0.9 g/cm$^3$, particularly preferably no higher than 0.7 g/cm$^3$. For example, it may be 0.5 g/cm$^3$ to 0.7 g/cm$^3$.

In the second aspect, the present application provides a method for preparing a porous carbon block material according to the first aspect of the present application, comprising
A) taking amorphous-carbon-coated diamond nanoparticles as precursor powders;
B) placing the precursor powders from step A) into a mold and pre-pressing them to form a pre-pressed billet;
C) placing the pre-pressed billet obtained from step B) into a sintering mold; placing the sintering mold containing the pre-pressed billet into sintering equipment; and then applying a sintering pressure, heating it to a sintering temperature, and holding the sintering pressure and sintering temperature to perform sintering, wherein
the sintering pressure is from 5 MPa to 100 MPa,
the sintering temperature is from 1000° C. to 2000° C.,
the heating rate is preferably from 5° C./min to 200° C./min, and
the temperature holding time is preferably from 0 min to 30 min; and
D) taking out the mold and releasing a sintered body from the mold to obtain the porous carbon block material.

In a preferred embodiment of the method according to the present application, the amorphous-carbon-coated diamond nanoparticles have a crystal grain size of from 5 nm to 400 nm, preferably from 5 nm to 350 nm, and more preferably from 5 nm to 300 nm.

In step B) of the method according to the present application, the pre-pressing is preferably performed under bi-directional pressures. Preferably, the pre-pressing is performed under a pressure from 1 MPa to 20 MPa, preferably from 2 MPa to 15 MPa, more preferably from 2 MPa to 10 MPa, and most preferably from 2 to 5 MPa. Preferably, the pressure holding time of the pre-pressing is from 1 min to 20 min, preferably from 1 min to 15 min, more preferably from 1 min to 10 min, and most preferably from 1 min to 5 min.

In step C) of the method according to the present application, the pre-pressed billet obtained from step B) is placed into a sintering mold; then the sintering mold containing the pre-pressed billet is placed into sintering equipment; and a sintering pressure is applied to conduct sintering.

In a preferred embodiment of the method according to the present application, the sintering in step C) is spark plasma sintering or hot press sintering. In the present disclosure, the spark plasma sintering or hot press sintering can be carried out on equipment known in the art, for example, commercially available equipment, such as SPS-3.20MK-I Spark Plasma Sintering Equipment from Sumitomo Coal Mining Co., Ltd. or HIGH MULTI 5000 Hot Press Sintering Equipment from Fuji Impulse Industries, Japan.

In a preferred embodiment of the method according to the present application, the sintering pressure in step C) may be set to from 5 MPa to 150 MPa, preferably from 8 MPa to 150 MPa, and more preferably from 10 MPa to 100 MPa. Within such pressure ranges, a sintered body having high strength can be obtained under a lower temperature; and as the applied pressure is relatively low, the industrial cost is reduced, and thus it is beneficial for industrial mass production. At the same time, within such pressure ranges, the phase transition speed of the diamond nano-powders can be controlled so as to prevent the overly fast growth of crystal grains.

In a preferred embodiment of the method according to the present application, the sintering temperature in step C) may be set to from 1000° C. to 2000° C., and more preferably from 1400° C. to 2000° C.

In a preferred embodiment of the method according to the present application, the heating rate in step C) may be set to from 8° C./min to 150° C./min, and more preferably from 10°C./min to 100° C./min.

In a preferred embodiment of the method according to the present application, the temperature holding time in step C) may be set to from 0 min to 20 min, and more preferably from 0 min to 15 min.

In step C) of the method of the present application, preferably, the sintering mold is a graphite mold, wherein the graphite mold is wrapped with carbon felt outside. Preferably, the sintering mold is a graphite mold, wherein the pre-pressed billet and the graphite mold are separated by a graphite paper, and the graphite mold is wrapped with carbon felt outside. Under the condition where the graphite mold is wrapped with carbon felt outside, the carbon felt may surround the gap in the graphite mold, so as to reduce heat diffusion in the graphite mold and reduce the temperature gradient inside the graphite mold. As a result, it is possible to prevent non-uniformity of the microscopic structure and mechanical properties of the sintered body.

Preferably, in step C) of the method according to the present application, an initial pressure of from 2 MPa to 10 MPa is optionally applied before the sintering step, and the sintering pressure is applied after vacuuming to a vacuum degree higher than $1 \times 10^{-1}$ Pa.

In a preferred embodiment of the method according to the present application, in step C), after the sintering pressure is stabilized to a preset value, the operations of heating to the sintering temperature, holding the temperature and sintering are conducted.

Preferably, after the sintering is completed and before step D), a further step C') of cooling and depressurizing to normal pressure is included, wherein, preferably, the cooling rate is from 100° C./min to 1000° C./min.

In various embodiments, preferred embodiments, and more preferred embodiments of the method according to the present application, the testing methods for various parameters, such as pore size, porosity, density, compressive strain, compressive strength, and helium gas leakage rate of the porous carbon block material, are performed according to those described for the porous carbon block material according to the first aspect of the present application, and thus are not repeated here to avoid duplication.

The porous carbon block material prepared according to the method of the present application is a rubber-like carbon as described for the porous carbon block material according to the first aspect of the present application and has specific structure as described above, which are not repeated here to avoid duplication.

EXAMPLES

The present application will be further described in more details below with reference to the examples. For the sake of brevity, some materials, equipment and method steps conventionally used in the art are not specified in the examples. All the technical methods and testing procedures (and related parameters) not specifically indicated in the examples should be carried out according to the conventional practice known by those skilled in the art and all materials and equipment without specific sources are routine materials and equipment commonly used in laboratory.

Materials

Amorphous-carbon-coated diamond nano-powders having a grain size of from 5 nm to 300 nm, available from Innochem Science and Technology Co., Ltd.

Equipment and Instruments

X-ray diffractometer, Bruker D8 Advance.
Transmission Electron Microscope, Talos F200X, available from Thermo Fisher Scientific.
Scanning Electron Microscope, Helios 5, available from Thermo Fisher Scientific.

Material Mechanical Property Testing Machine, TE-3000, available from Jin Yin Feng Instrument Ltd., Ji Nan, Shandong Dong Province, China.

Helium gas leakage Rate Tester, a self-built instrument, which is described in details above.

Spark plasma sintering equipment, SPS-3.20MK-I, available from Sumitomo Coal Mining Co., Ltd.

Hot Press Sintering Equipment, HIGH-MULTI-10000, available from Fuji Impulse Industries, Japan.

Example 1

A porous carbon block material was prepared according to the following steps:
A) Weighing: weighing 1 g of amorphous-carbon-coated diamond nanoparticles as precursor powders.
B) Charging: placing the precursor powders as weighed in step A) into a mold having an inner diameter of 15 mm, pre-pressing by applying bi-directional pressure of 5 MPa, with the pressure holding time being 5 min, so as to obtain a pre-pressed billet;
C) Sintering: putting the pre-pressed billet obtained in step B) into a graphite mold for sintering, wherein the pre-pressed billet is separated from the graphite mold via a graphite paper and the graphite mold is wrapped with carbon felt outside, to obtain a mold containing the pre-pressed billet; then placing the above mold containing the pre-pressed billet into spark plasma sintering equipment to undergo spark plasma sintering, wherein an initial pressure of 5 MPa is applied, and a vacuum degree of $5 \times 10^{-1}$ Pa is vacuumed, afterward, a sintering pressure of 10 MPa is applied, after the sintering pressure is stable, the temperature is raised to a sintering temperature of 1400° C. at the heating rate being 100°Groin, and the temperature is held for 1 min, to perform the sintering; and turning off the heating power after the sintering is completed and relieving the pressure;
D) Discharging: after the cooling of the temperature in the equipment, take the mold out and release a sintered body from the mold to obtain a porous carbon block material.

Example 2

The porous carbon block material was prepared in a method similar to Example 1, with the exception that a hot press sintering is employed with the parameters as shown in Table 1.

Example 3

The porous carbon block material was prepared in a method similar to Example 1, with the exception that the parameters for spark plasma sintering are changed, as shown in Table 1.

TABLE 1

Method parameters of Exampes 1-3

| | | Examples Nos. | | |
|---|---|---|---|---|
| | Parameters | 1 | 2 | 3 |
| Pre-pressing | Pressure of pre-pressing (MPa) | 5 | 3 | 5 |
| | Holding time for pre-pressing (min) | 5 | 2 | 3 |

TABLE 1-continued

Method parameters of Exampes 1-3

| | Parameters | Examples Nos. | | |
|---|---|---|---|---|
| | | 1 | 2 | 3 |
| Sintering | Type of sintering | Spark plasma sintering | Hot press sintering | Spark plasma sintering |
| | Sintering pressure (MPa) | 10 | 40 | 100 |
| | Heating rate (° C./min) | 100 | 20 | 100 |
| | Sintering temperature (° C.) | 1400 | 1700 | 2000 |
| | Temperature holding time (min) | 1 | 5 | 1 |

Performance Testing

The following performance testing was performed at room temperature and under normal pressure.

The compressive strength and compressive strain were tested on the Mechanical Property Testing Machine according to the method described in GBT 8489-2006, wherein the test sample was a cylinder having a diameter of 3 mm and a height of 4.5 mm, and the loaded strain rate of the Mechanical Property Testing Machine was $5 \times 10^{-4}$.

The density can be calculated by dividing the mass of a sample by its volume. Particularly, the sample was processed into a cylinder with a diameter of 20 mm and a height of 5 mm, and the volume of the sample $V_{sample}$ was calculated according to the formula for calculating the volume of the cylinder; and then the sample was weighed on a high precision electronic balance to obtain the weight of the sample $m_{sample}$. The density of the sample $\rho_{sample} = m_{sample}/V_{sample}$.

The porosity can be calculated based on the tested density of the sample and the theoretical density of graphite. Specifically, the porosity can be calculated as follows:

$$k = 1 - \rho_{sample}/\rho_{graphite},$$

wherein, k is the porosity, $\rho_{sample}$ is the density of the sample, and $\rho_{graphite}$ is the theoretical density of graphite (2.26 g/cm³).

Transmission electron microscopy image: a sample was ground in an agate mortar and placed in alcohol for ultrasonic dispersion, then the mixture of alcohol and sample was allowed to stand for 10 minutes, the supernatant was pipette with a dropper and dropped onto a copper micro-grid, after the alcohol on the micro-grid evaporated, the micro-grid with sample powders thereon was placed in a transmission electron microscope for observation.

The pore size can be directly measured in representative material areas that were randomly selected from the high-resolution transmission electron microscopy images.

The gas tightness of the sample can be characterized by testing its helium gas leakage rate. The testing of helium gas leakage rate was performed on a self-built instrument shown in FIG. 9, as described above.

Test Results

Pore Size

The pore diameters of the porous carbon block materials prepared in Examples 1 to 3 were measured according to the above method, and the test results are shown in Table 2. It can be seen that the porous carbon block materials of the present application have small pore sizes.

Porosity

The porosities of the porous carbon block materials prepared in Examples 1 to 3 were measured and calculated according to the above method, and the test results are shown in Table 2. It can be seen that the porous carbon block materials of the present application have high porosities.

Density

Figure 1B:
FIG. 1B is a photo of floating the porous carbon block material prepared according to one embodiment of the present application on water.

As shown in FIG. 1A, the porous carbon block material prepared in Example 1 is an opaque black block. As shown in FIG. 1B, it can be clearly observed that the porous carbon block material prepared in Example 1 can float on water, and thus has a density lower than that of water (1 g/cm³). According to the measuring method described above, the porous carbon block material prepared in Example 1 has a density of 0.5 g/cm³. The porous carbon block materials prepared in Examples 2 and 3 have similar shapes and their densities are lower than water, as shown in Table 2.

Helium Gas Leakage Rate

The helium gas leakage rates of the porous carbon block material prepared in Examples 1-3 were tested according to the above method, and the testing results are shown in Table 2. It can be seen that the porous carbon block materials of the present application have an extremely low helium gas leakage rate, and thus have a very high gas tightness.

According to the helium gas leakage rate test, it can be seen that the helium gas leakage rate of the porous carbon block material of each example is less than or equal to $2 \times 10^{-5}$ Pa·m³/s, which is comparable to the helium gas leakage rate of rubber ($1 \times 10^{-5}$ Pa·m³/s). The testing results of the helium gas leakage rate directly show that the materials according to the present patent application have high gas tightness on the one hand, and on the other hand indicate that the pores in the porous carbon materials according to the present patent application are closed pores.

Morphology and Structure

Figure 2:
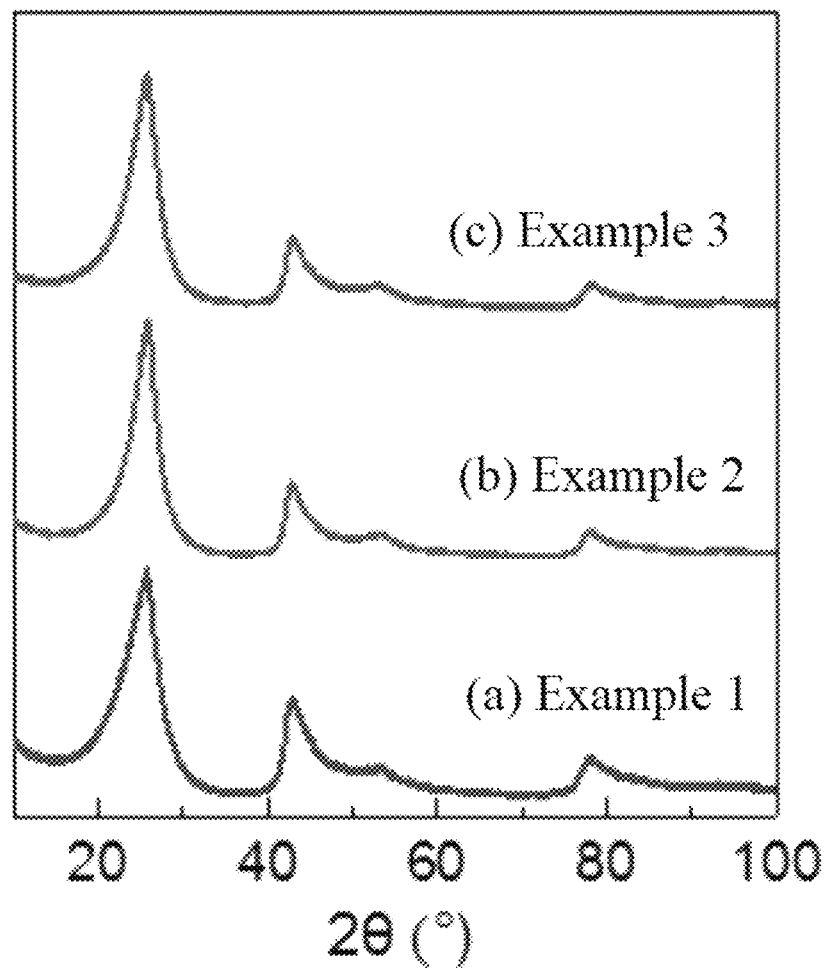
FIG. 2 shows X-ray diffraction patterns of the porous carbon block materials obtained in Examples 1 to 3 according to the present application, wherein the curve (a) represents Example 1, the curve (b) represents Example 2, and the curve (c) represents Example 3.

The porous carbon block materials prepared in Examples 1-3 were analyzed using an X-ray diffractometer. As shown in FIG. 2, it can be seen that in the porous carbon block materials prepared in Examples 1-3, the amorphous-carbon-coated diamond nanoparticles have been completely transformed into a graphite structure in the form of chaotic layers.

Figure 3:
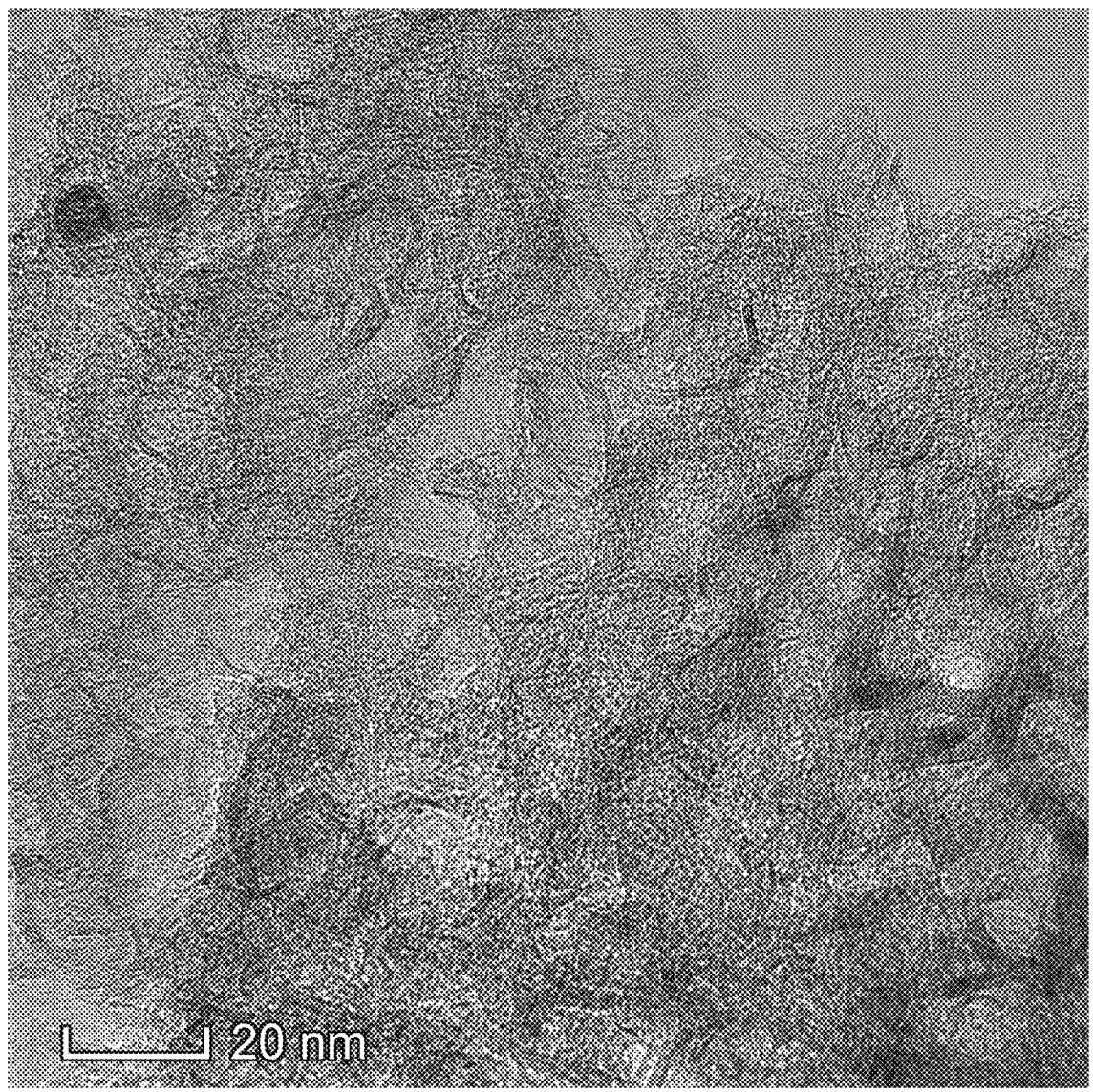
FIG. 3 shows a high-resolution transmission electron micrograph of the porous carbon block material prepared in Example 1 according to the present application.
Figure 4:
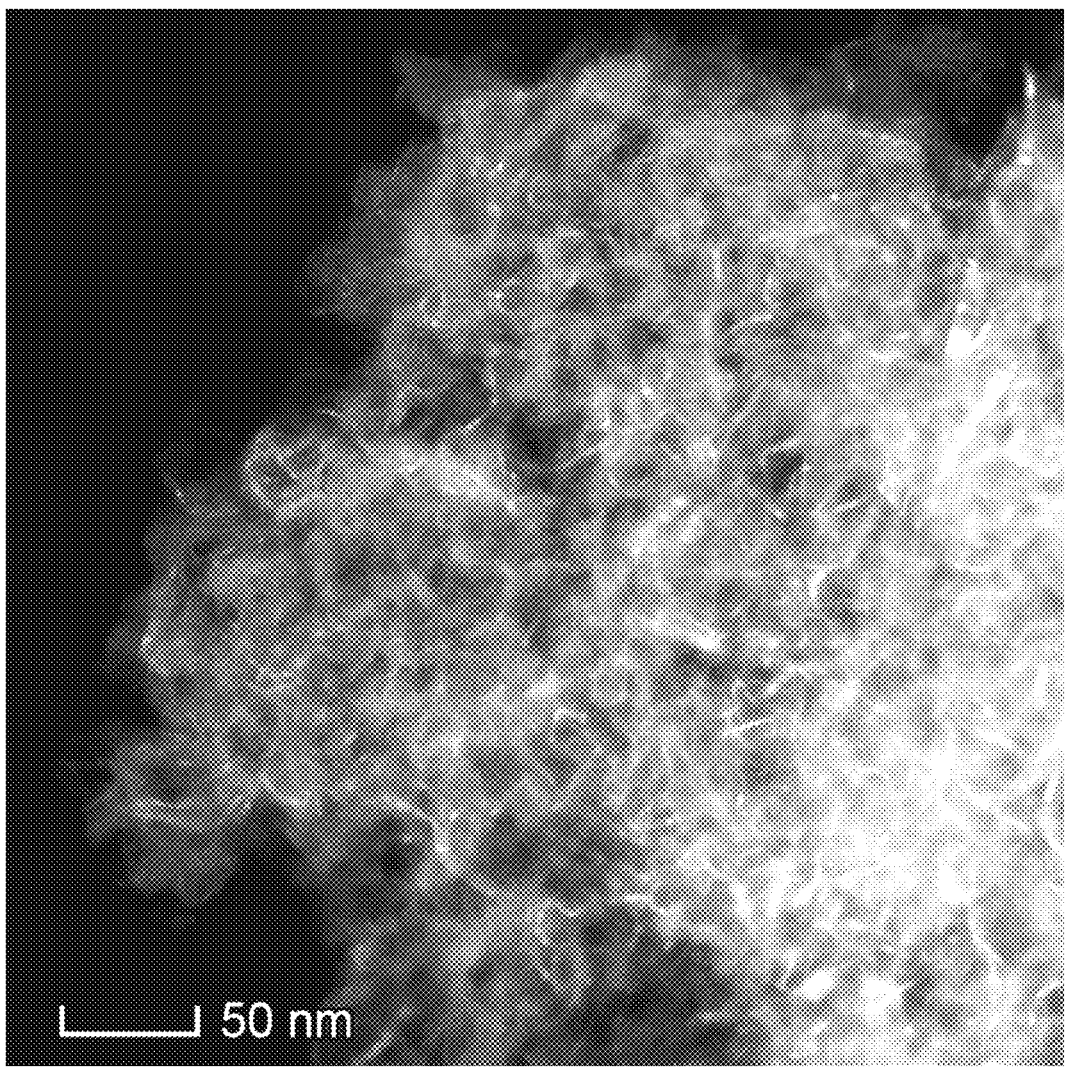
FIG. 4 shows a bright-field image of a transmission electron microscopy of the porous carbon block material prepared in Example 1 according to the present application.

FIGS. 3 and 4 are the transmission electron microscope images of the porous carbon block material prepared in Example 1. It can be seen that the prepared carbon block material is composed of chaotically arranged multilayer graphene. The curved graphene entangles and cross-links with each other to form a large number of closed pores having a size of from 5 nm to 30 nm. Since these pores are closed, the prepared porous carbon block material has a very low helium gas leakage rate. The porous carbon block materials prepared in Examples 2 and 3 have similar structures, and thus have very low helium gas leakage rate too. The helium gas leakage rates of the porous carbon block materials prepared in Examples 1-3 are shown in Table 2.

Figure 5:
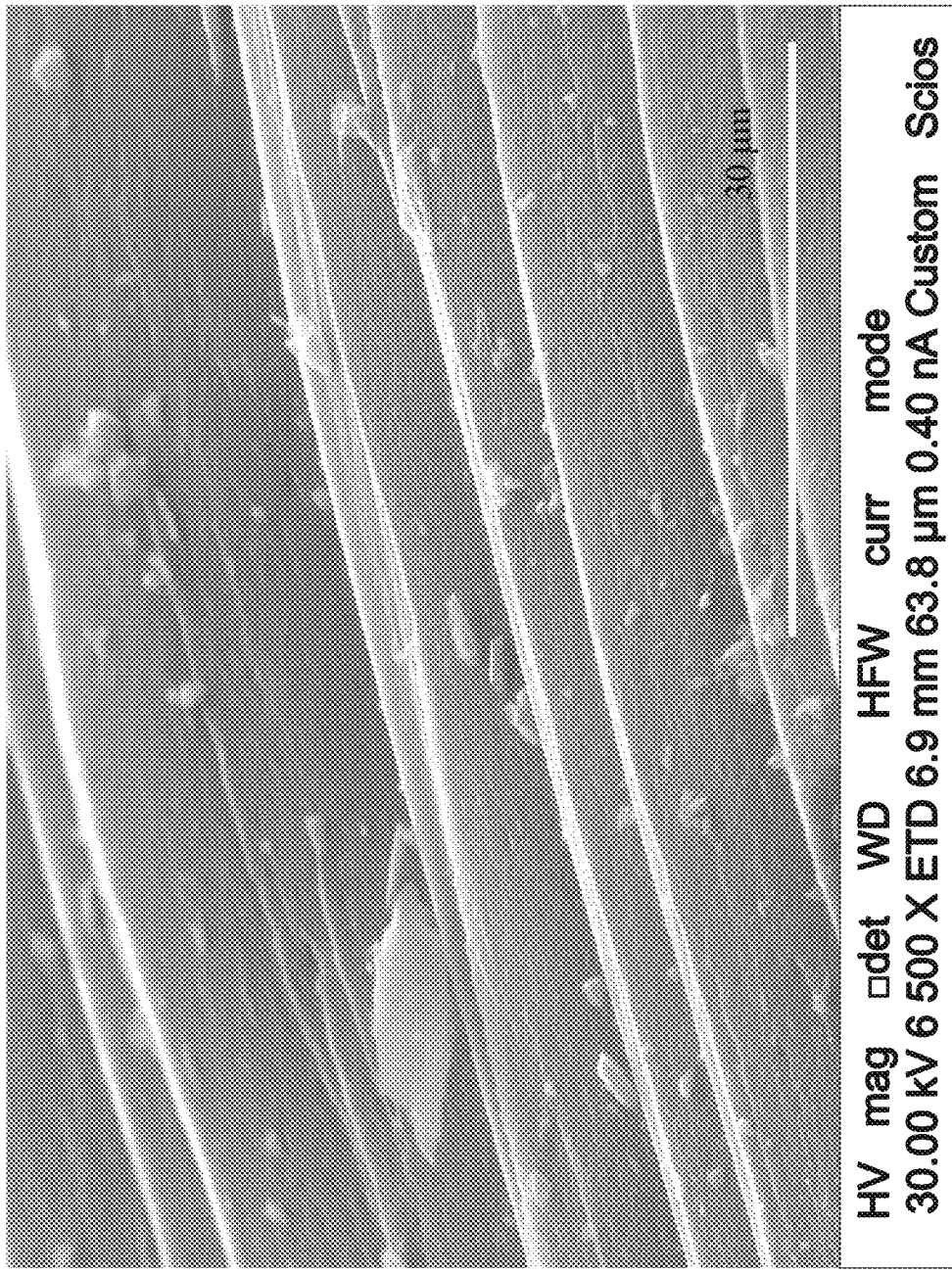
FIG. 5 shows a scanning electron microscope image of the porous carbon block material prepared according to one embodiment of the present application.

FIG. 5 is the scanning electron microscope image of the porous carbon block material prepared in Example 1. As shown in FIG. 5, the cross-sectional surface of the porous carbon block material prepared according to the present application is flat, indicating that the pores inside the porous carbon block material are very small and the pores cannot be observed via the scanning electron microscope. The porous carbon block materials prepared in Examples 2-3 have pores of similar size.

Compressive Strength and Compressive Strain

Figure 6A:
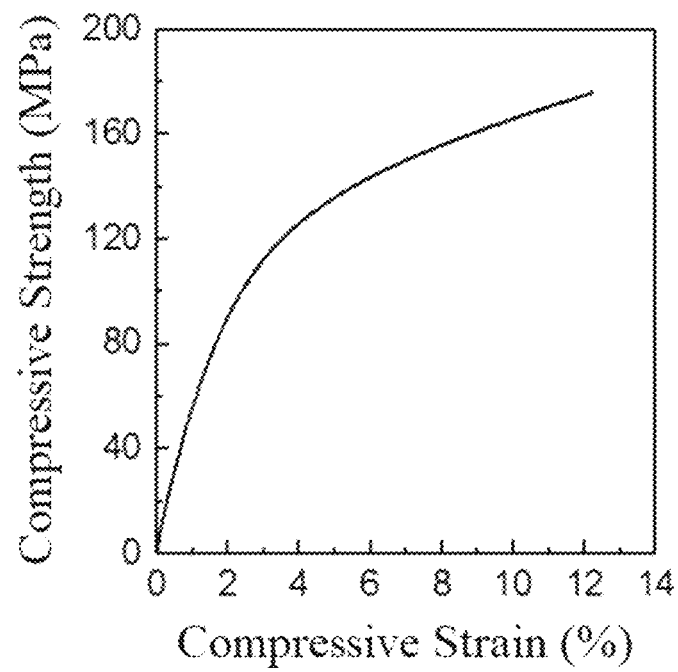
Figure 7A:
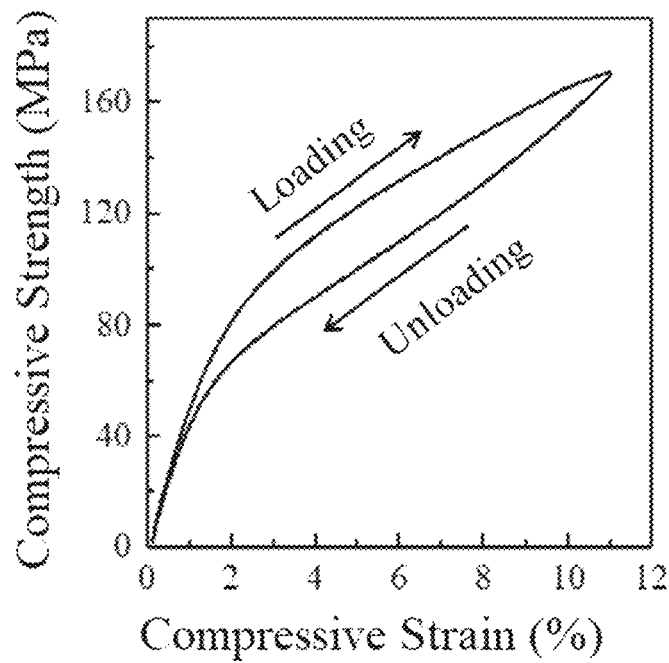
Figure 8:
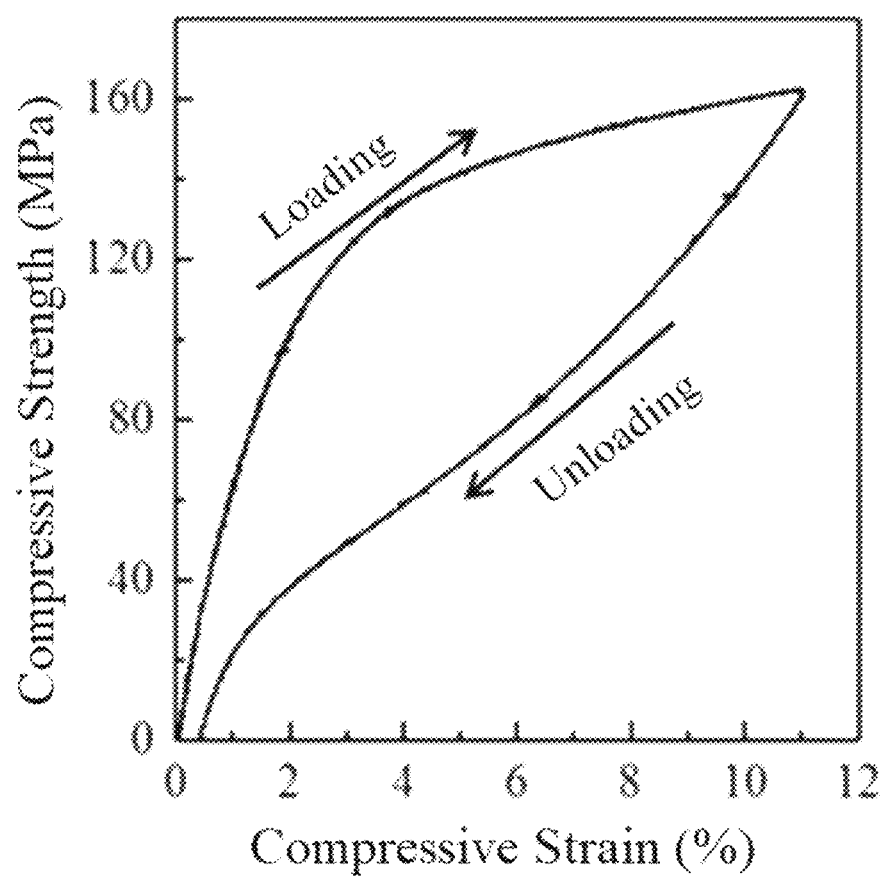
FIG. 8 shows a stress-strain curve of cyclic compression at room temperature of the porous carbon block material obtained in Example 1 according to the present application, measured under air atmosphere at 600° C.

FIG. 6A shows a single compressive stress-strain curve of the porous carbon block material prepared in Example 1, wherein the compressive strength is 175 MPa and the compressive strain is 12.2%, and the stress-strain curve has obvious nonlinear characteristics. FIG. 7A shows a cyclic compressive stress-strain curve of the product prepared in Example 1, wherein the maximum compressive strength is 168 MPa and the maximum compressive strain is 11%, and the strain of the sample fully returns to zero after the stress is removed, indicating that the sample has purely elastic deformation. FIG. 8 shows a cyclic compressive stress-strain curve of the porous carbon block material prepared in Example 1 measured in an air atmosphere at 600° C., indicating that the elastic behavior is basically maintained at high temperatures.

Figure 6B:
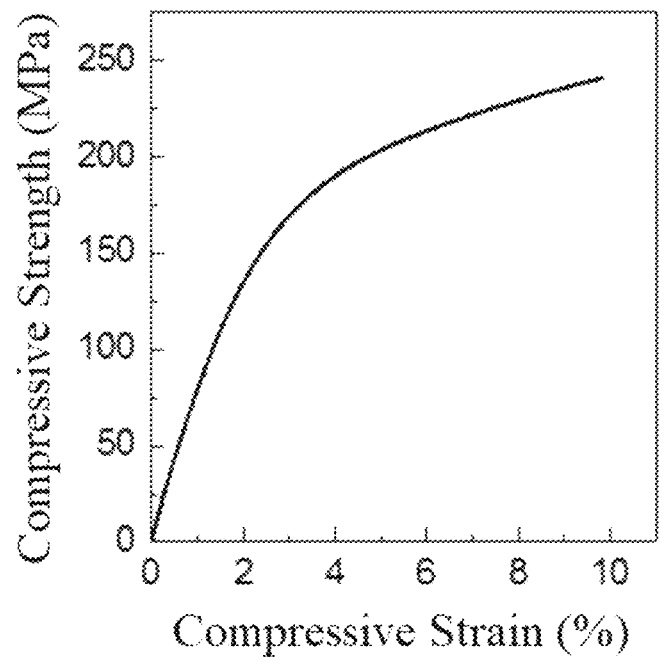
Figure 7B:
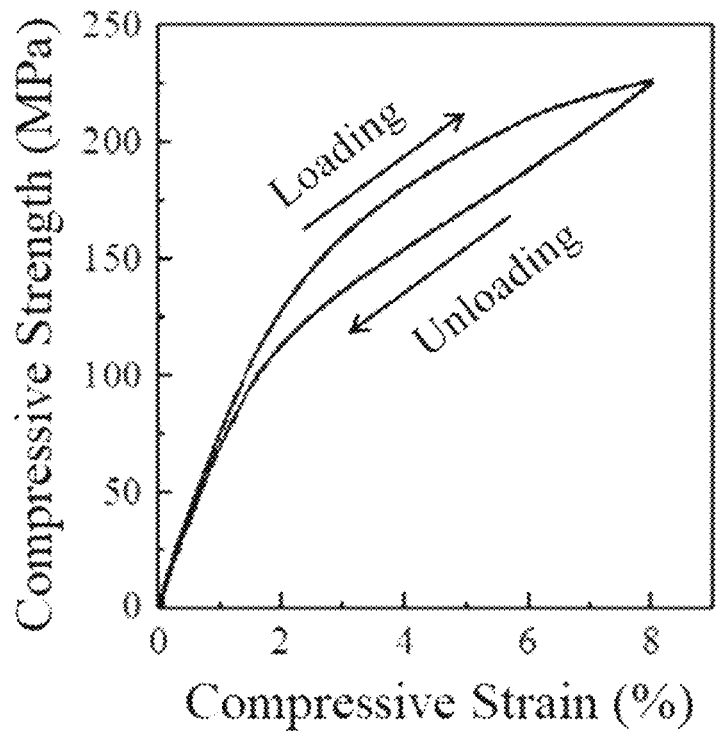

FIG. 6B shows a single compressive stress-strain curve of the porous carbon block material prepared in Example 2, wherein the compressive strength is 240 MPa and the compressive strain is 9.8%, and the stress-strain curve has obvious nonlinear characteristics. FIG. 7B shows a cyclic compressive stress-strain curve of the porous carbon block material prepared in Example 2, wherein the maximum compressive strength is 225 MPa and the maximum compressive strain is 8%, and the strain of the sample returns to zero after the stress is removed.

Figure 6C:
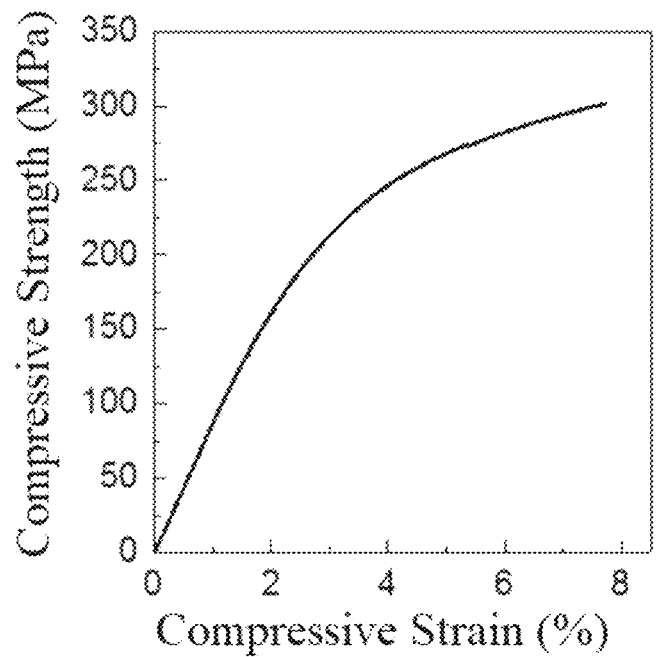
Figure 7C:
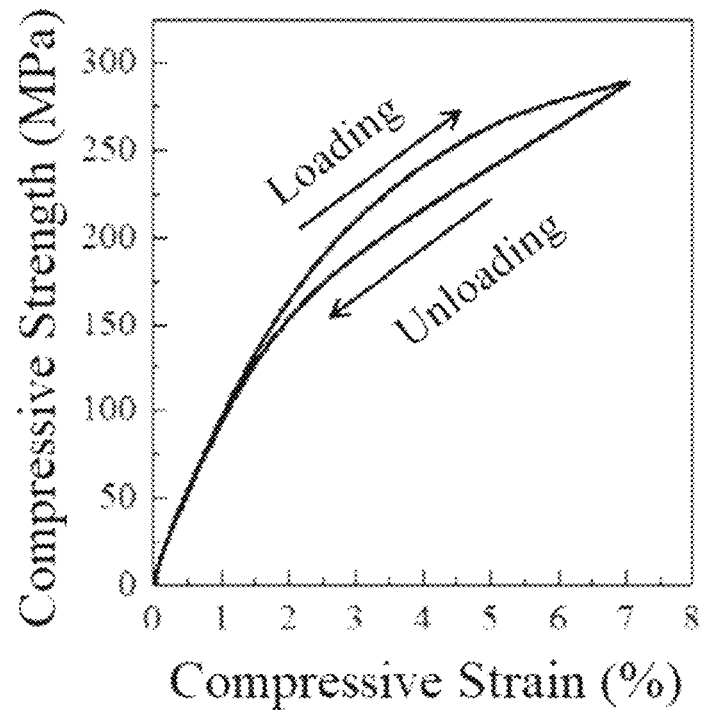

FIG. 6C shows a single compressive stress-strain curve of the porous carbon block material prepared in Example 3, wherein the compressive strength is 301 MPa and the compressive strain is 7.7%, and the stress-strain curve has obvious nonlinear characteristics. FIG. 7C shows a cyclic compressive stress-strain curve of the porous carbon block material prepared in Example 3, wherein the maximum compressive strength is 285 MPa and the maximum compressive strain is 7%, and the strain of the sample returns to zero after the stress is removed.

TABLE 2

Properties of porous carbon block materials prepared in Examples 1-3

| Properties | Examples Nos. | | |
|---|---|---|---|
| | 1 | 2 | 3 |
| Density (g/cm$^3$) | 0.5 | 0.85 | 0.93 |
| Porosity (%) | 78 | 62 | 59 |
| Pore Size (nm) | 5-30 | 5-35 | 5-20 |
| Helium Gas Leakage Rate (Pa · m$^3$/s) | $1 \times 10^{-5}$ | $1 \times 10^{-5}$ | $2 \times 10^{-5}$ |
| Compressive strength (MPa) | 175 | 240 | 301 |
| Compressive strain (%) | 12.2 | 9.8 | 7.7 |

The above embodiments are only preferably specific embodiments of the present application, the intended protection scope, however, is not limited thereto. Any changes or alternatives that could be readily envisaged by any person skilled in the art within the technical scope disclosed in the present application shall fall within the intended protection scope. Therefore, the intended protection scope should be determined by the scope as claimed in the claims.

The specification of the present application lists some optional materials for various components, but those skilled in the art should understand that the above listings of components or materials are neither restrictive nor exhaustive. All the components can be equally replaced with other equivalent materials not mentioned in the specification of the application to achieve the purpose of the application. The specific examples mentioned in the specification are only for the purpose of explanation and not for limiting the intended protection scope.

In addition, the amount ranges of each component described in the present application include any combination of any lower with any upper limit mentioned in the specification and include any range obtained by using any specific amount of the component disclosed in each specific embodiment as the upper or lower limit. All these ranges are included in the intended protection scope. These combined ranges are not exhaustively listed in the description only for the purpose of simplicity. Moreover, each feature of the present application listed in the specification can be combined with any other feature of the present application, and any such combinations also fall within the intended protection scope. These combined ranges are not exhaustively listed in the description only for the purpose of simplicity.

What is claimed is:

1. A porous carbon block material, wherein
   the porous carbon block material has a pore size in the range of from 3 nm to 100 nm;
   the porous carbon block material has a porosity of from 50% to 87%;
   the pores in the porous carbon block material are closed pores; and
   the porous carbon block material has a density of from 0.3 g/cm$^3$ to 1.1 g/cm$^3$.

2. The porous carbon block material according to claim 1, wherein,
   the porous carbon block material has a compressive strain of ≥5%; and/or
   the porous carbon block material has a compressive strength of >100 MPa.

3. The porous carbon block material according to claim 1, wherein
   the porous carbon block material has a helium gas leakage rate of ≤10×10$^{-5}$ Pa·m$^3$/s.

4. The porous carbon block material according to claim 1, wherein
   the porous carbon block material has the pore size in the range of from 5 nm to 50 nm; and
   the porous carbon block material has the porosity of from 56% to 82%.

5. The porous carbon block material according to claim 4, wherein
   the porous carbon block material has the pore size in the range of from 5 nm to 30 nm; and
   the porous carbon block material has the porosity of from 60% to 80%.

6. The porous carbon block material according to claim 3, wherein
   the porous carbon block material has the helium gas leakage rate of ≤4×10$^{-5}$ Pa·m$^3$/s.

7. The porous carbon block material according to claim 6, wherein
   the porous carbon block material has the helium gas leakage rate of ≤2×10$^{-5}$ Pa·m$^3$/s.

8. The porous carbon block material according to claim 2, wherein,
   the porous carbon block material has the compressive strain of ≥ 6%; and/or
   the porous carbon block material has the compressive strength of >150 MPa.

9. The porous carbon block material according to claim 1, wherein
   the porous carbon block material has the density of from 0.4 g/cm$^3$ to 1.0 g/cm$^3$.

10. The porous carbon block material according to claim 9, wherein
the porous carbon block material has the density of from 0.5 g/cm³ to 0.9 g/cm³.

* * * * *